United States Patent [19]

Carpenter

[11] Patent Number: 5,134,810
[45] Date of Patent: Aug. 4, 1992

[54] MOBILE OUTSIDE SURFACE PIPE CLEANER

[75] Inventor: James H. Carpenter, Hagerstown, Md.

[73] Assignee: Pangborn Corporation, Hagerstown, Md.

[21] Appl. No.: 695,414

[22] Filed: May 3, 1991

[51] Int. Cl.[5] .................. B24C 3/00; B24C 9/00; B24C 3/06
[52] U.S. Cl. ........................... 51/410; 51/424; 51/429
[58] Field of Search .................. 51/410, 417, 424, 426, 51/428, 429; 15/104.04, 104.03; 198/703, 711, 712

[56] References Cited

U.S. PATENT DOCUMENTS

| | | | |
|---|---|---|---|
| 1,752,979 | 4/1930 | Ehrhart | 198/703 |
| 2,131,770 | 10/1938 | Turnbull | 51/426 |
| 2,460,989 | 2/1949 | Kraner | 51/426 |
| 3,756,377 | 9/1973 | Goff | 51/424 |
| 4,433,511 | 2/1984 | Swain | 51/424 |
| 4,753,052 | 6/1988 | Dickson | 51/424 |
| 4,827,678 | 5/1989 | MacMillan et al. | 51/425 |
| 4,941,296 | 7/1990 | Carpenter | 51/424 |
| 4,953,496 | 9/1990 | Taylor et al. | 51/429 |

*Primary Examiner*—Bruce M. Kisliuk
*Assistant Examiner*—Bo Bounkong
*Attorney, Agent, or Firm*—Charles E. Brown

[57] ABSTRACT

An abrasive cleaning machine specifically constructed for cleaning pipes. The machine is mounted on an elevated portion of a previously buried pipe and is moved along the pipe to effect cleaning of the pipe. The machine basically includes a simple housing which carries a plurality of blast wheels specifically positioned to provide a frustoconical curtain of abrasive particles through which the pipe being cleaned passes. Suitable wear plates are provided to prevent undue wear on adjacent parts of the cleaning machine. Spent abrasive particles and removed material are collected at the bottom of the cleaning machine in a collection trough through which there runs a lower run of an endless belt. The belt is of a wire mesh construction so that abrasive particles and removed material freely passes through the belt. The belt carries buckets which are so configurated that when the buckets reach a top horizontal run of the belt, the collected materials within the bucket are discharged from the bucket through the belt. The buckets are mounted on the belt in a manner whereby the belt is free to flex or bend around support rollers. The abrasive particles and removed material are emptied into a bin from which they are discharged in a curtain and through which air flows so as to separate the foreign matter from the abrasive particles. The abrasive particles then fall into hoppers from which the abrasive particles are delivered to the individual blast wheels.

25 Claims, 7 Drawing Sheets

MOBILE OUTSIDE SURFACE PIPE CLEANER

This invention relates in general to new and useful improvements in abrasive blast wheel cleaners, and more particularly, a cleaner which is intended to be moved along a length of pipe and to automatically clean the exterior surface of such pipe by a plurality of blasts of abrasive particles.

BACKGROUND OF THE INVENTION

Large diameter pipes are buried underground and normally are provided with a protective coating. At intervals, this protective coating must be removed and replaced. This is accomplished by progressively digging up the pipe and lifting it from the trench in which it is buried, at which time the pipe is externally cleaned and then recoated. A typical disclosure of such an operation is found in the patent to Hoffman, U.S. Pat. No. 4,603,519 granted Aug. 5, 1986. This patent also discloses a blast machine which travels along the pipe and cleans the pipe by way of blasts of abrasive particles. While it is understood that the Hoffman machine serves this purpose, it is quite bulky and very expensive.

SUMMARY OF THE INVENTION

This invention relates to a very simple blast cleaner which will move along a pipe and automatically clean the exterior surface thereof. The blast cleaner is transported by a suitable transport device which is not part of this invention.

In particular, the blast cleaner is adaptable to a variation of pipe diameters and includes a plurality of blast wheels which are so directed whereby to obtain a maximum efficiency of blast cleaning The blast cleaner is provided with suitable wear plates which are specifically placed so as to interrupt any blasts of abrasive particles which are not directed to strike the pipe which is being cleaned.

The blast cleaner also includes an apparatus for retrieving and cleaning spent abrasive particles in an effective and efficient manner on a continuous basis. This apparatus includes an endless wire belt through which abrasive particles are free to pass and which belt carries buckets for removing collected abrasive particles and foreign matter from a collection trough and elevating the same where the buckets dump the collected material onto an upper run of the belt with the materials again passing through the belt and into a cleaning arrangement including hoppers from blast wheels for reuse.

With the above and other objects in view that will hereinafter appear, the nature of the invention will be more clearly understood by reference to the following detailed description, the appended claims, and the several views illustrated in the accompanying drawings.

DESCRIPTION OF THE INVENTION

Referring now to the drawings in detail, reference is first made to FIGS. 1-4 which show the overall details of the cleaning machine which is the subject of this invention, the cleaning machine being generally identified by the numeral 20. The cleaning machine 20 includes a hollow housing generally identified by the numeral 22. The housing 22 includes a major housing portion 24 in which there is encased the abrasive particle collection and return apparatus to be described in detail hereinafter. The housing 22 also includes at the right side of the housing portion 24, a housing portion 26 on which there is mounted a plurality of blast wheel units each identified by the numeral 28 and including an externally projecting electric motor 30. A sealing curtain support housing portion 32 projects to the right from the housing portion 26 while a somewhat similar sealing curtain housing portion 34 projects to the left from the housing portion 24.

Figure 1:
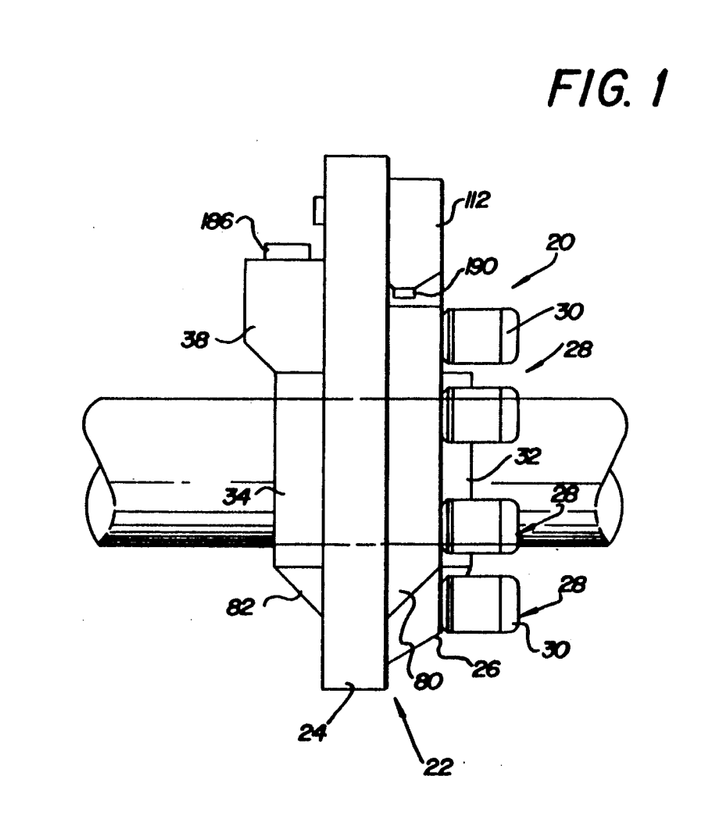
FIG. 1 is a side elevational view of the blast machine and shows the same positioned relative to a maximum diameter pipe for which it is intended for cleaning.
Figure 2:
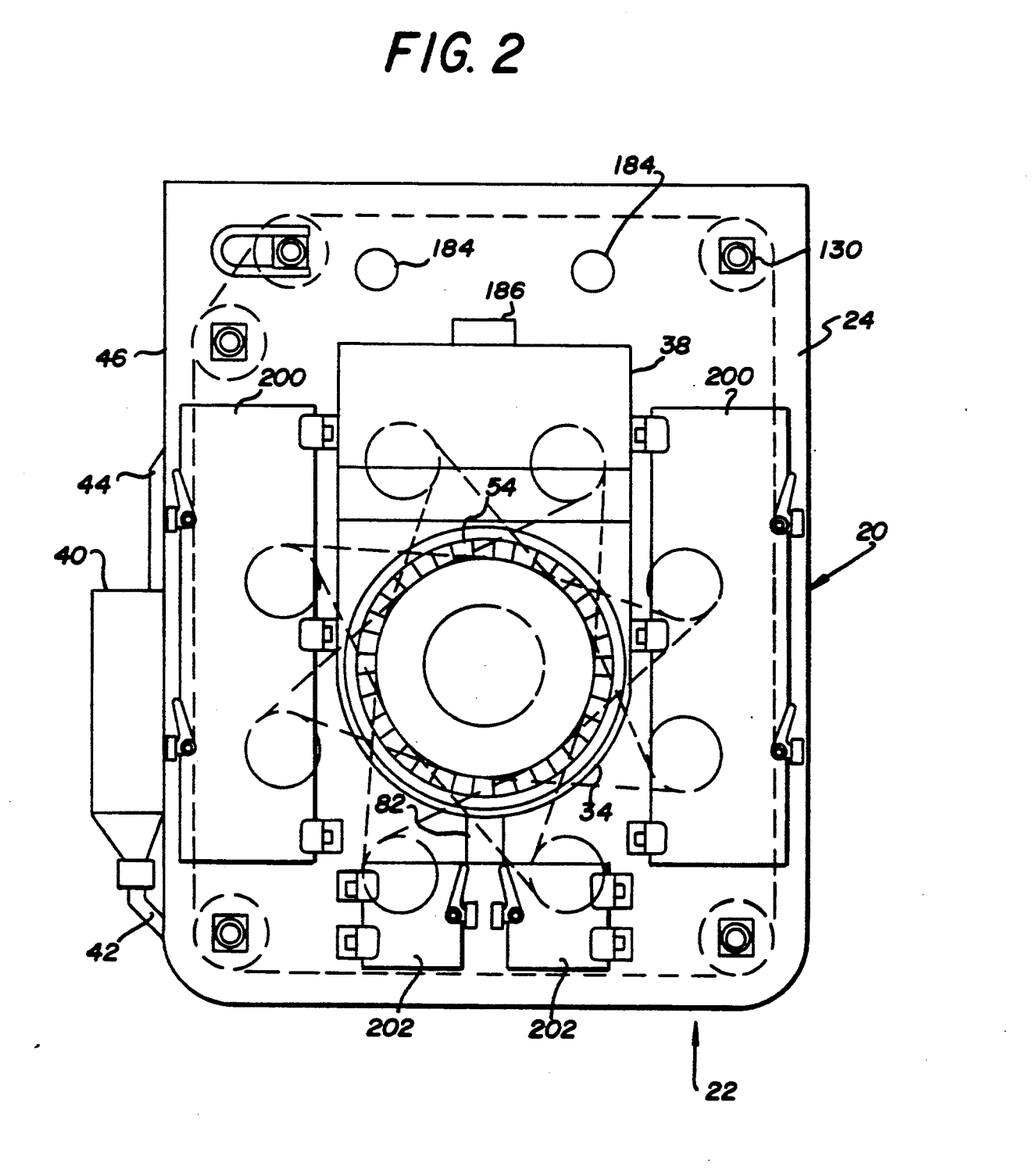
FIG. 2 is an end view of the blast machine of FIG. 1 viewed from the left of FIG. 1 and shows further details of the machine.
Figure 3:
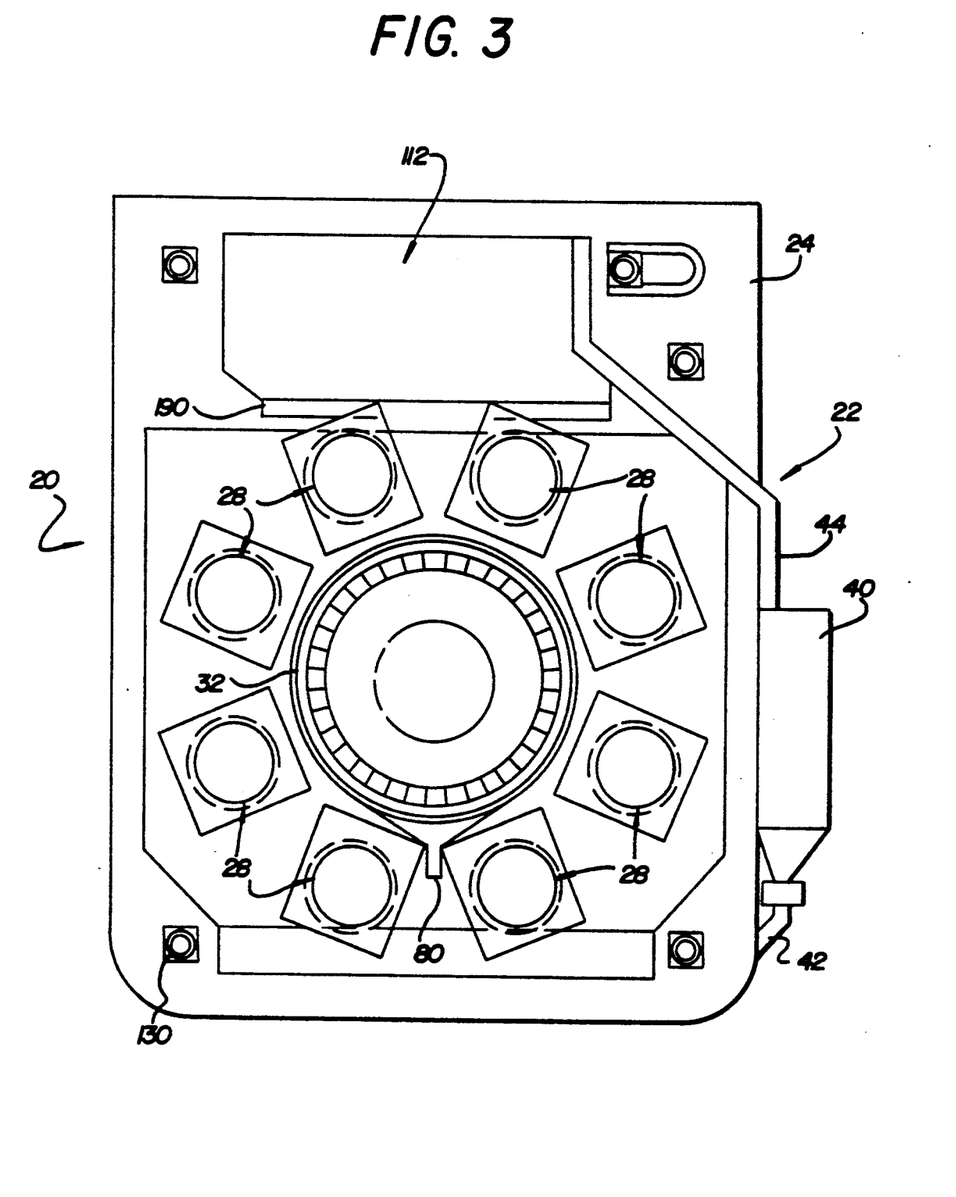
FIG. 3 is an end view of the blast machine of FIG. 1 taken from the right of FIG. 1 and shows further details of the blast machine including the position of the blast wheels.
Figure 4:
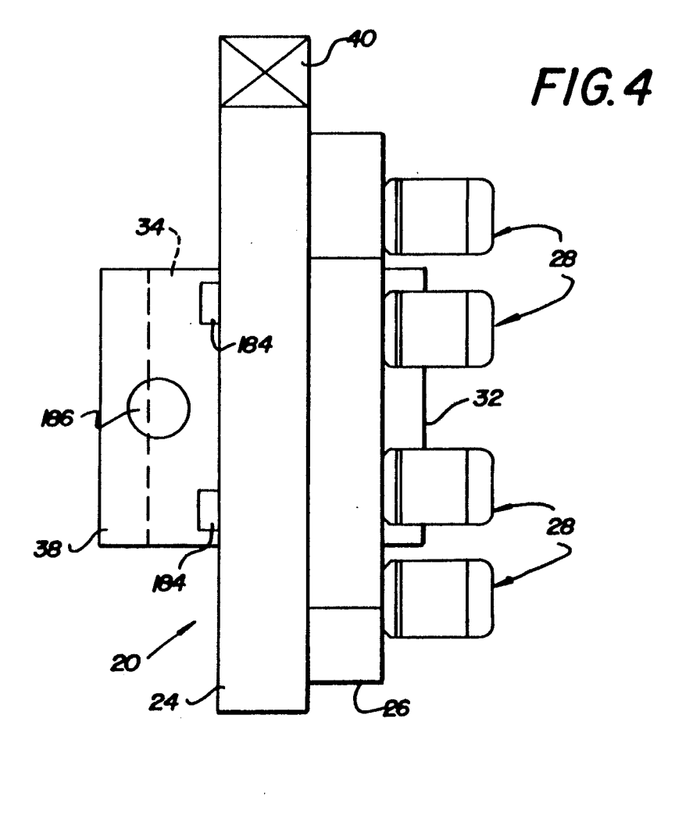
FIG. 4 is a top plan view of the blast machine of FIG. 1.

As is best shown in FIGS. 1 and 3, an abrasive storage bin 112 extends from the right of the housing portion 24 above the housing portion 26 while a vent hood 38 extends from the left of the upper part of the housing portion 24 above the housing portion 34 as is best shown in FIGS. 1 and 2. Also, as is best shown in FIGS. 2, 3 and 4, there is mounted at one side of the housing portion 24 an abrasive replenisher 40 having a return line 42 directed into the lower part of the housing portion 24. The abrasive replenisher 40 receives abrasives through an abrasive line 44 from the top of the cleaning machine 20.

Figure 5:
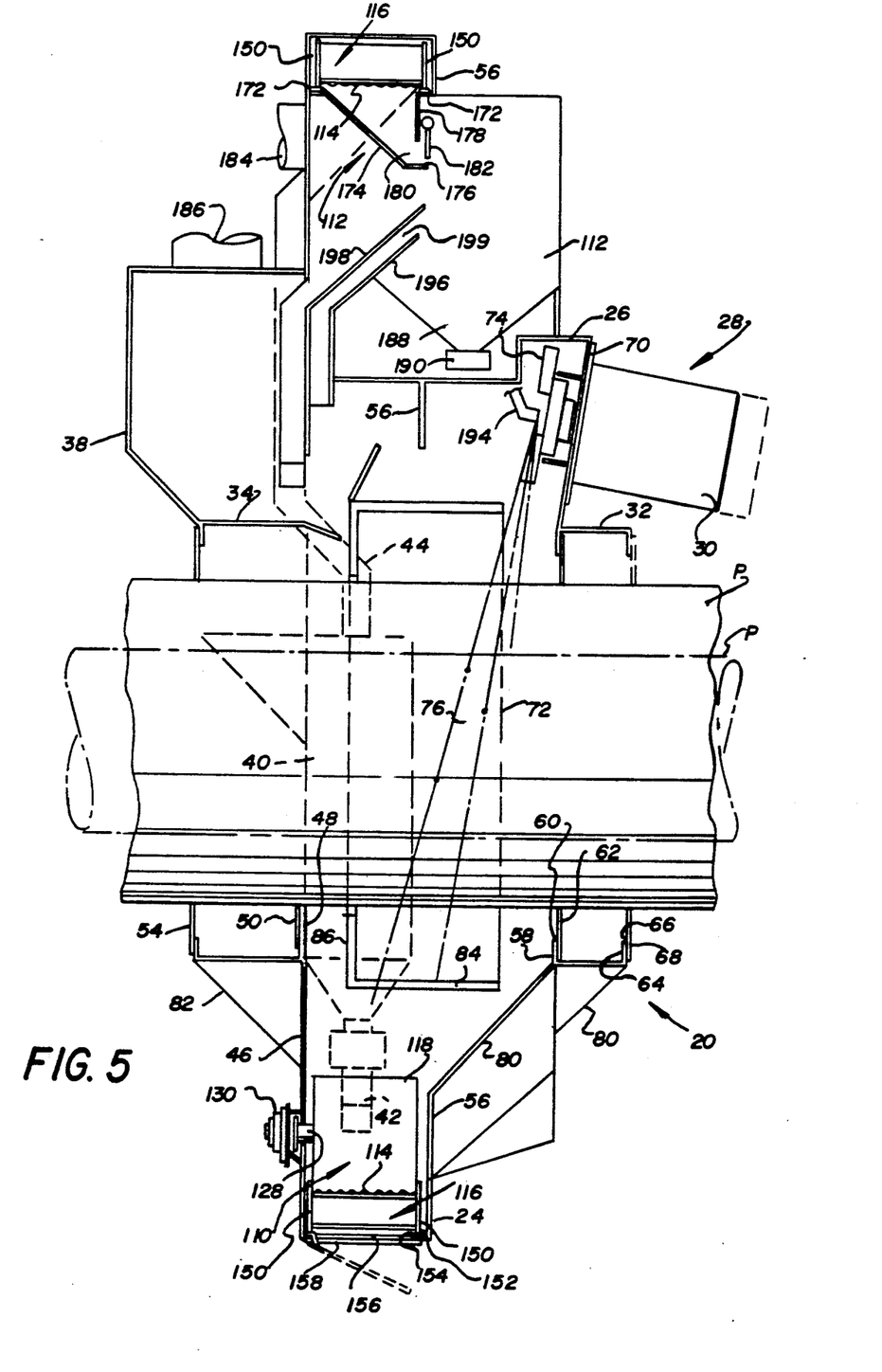
FIG. 5 is a longitudinal vertical sectional view taken through the blast machine of FIG. 1 and shows specifically the details of the interior of the machine including abrasive collection apparatus.

Referring now to FIG. 5, it will be seen that the housing portion 24 includes a transverse end wall 46 from which the housing portion 34 projects and this end wall 46 has a large diameter opening 48 through which a typical pipe P to be cleaned passes. As is schematically shown in FIG. 5, the pipe may vary in diameter to be cleaned by the illustrated cleaning machine from 20 inches to 36 inches. A suitable curtain 50 is carried by the end wall 46 and projects annular end wall 52 which carries an exterior curtain 54 of a construction similar to the curtain 50.

On the right side of the housing portion 24, as shown in FIG. 5, there is a partial end wall 56 for the housing portion 24. The housing portion 26 is carried by the end wall 56 and includes a radially inner annular end wall 58 having an opening 60 through which the pipe P freely passes. The end wall 58 carries a curtain 62 projecting into the opening 60 for engaging a pipe passing therethrough.

The housing portion 26 also includes an annular end wall 64 defining an opening 66 which is generally aligned with the opening 60 and which is closed by a further curtain 68.

Figure 7:
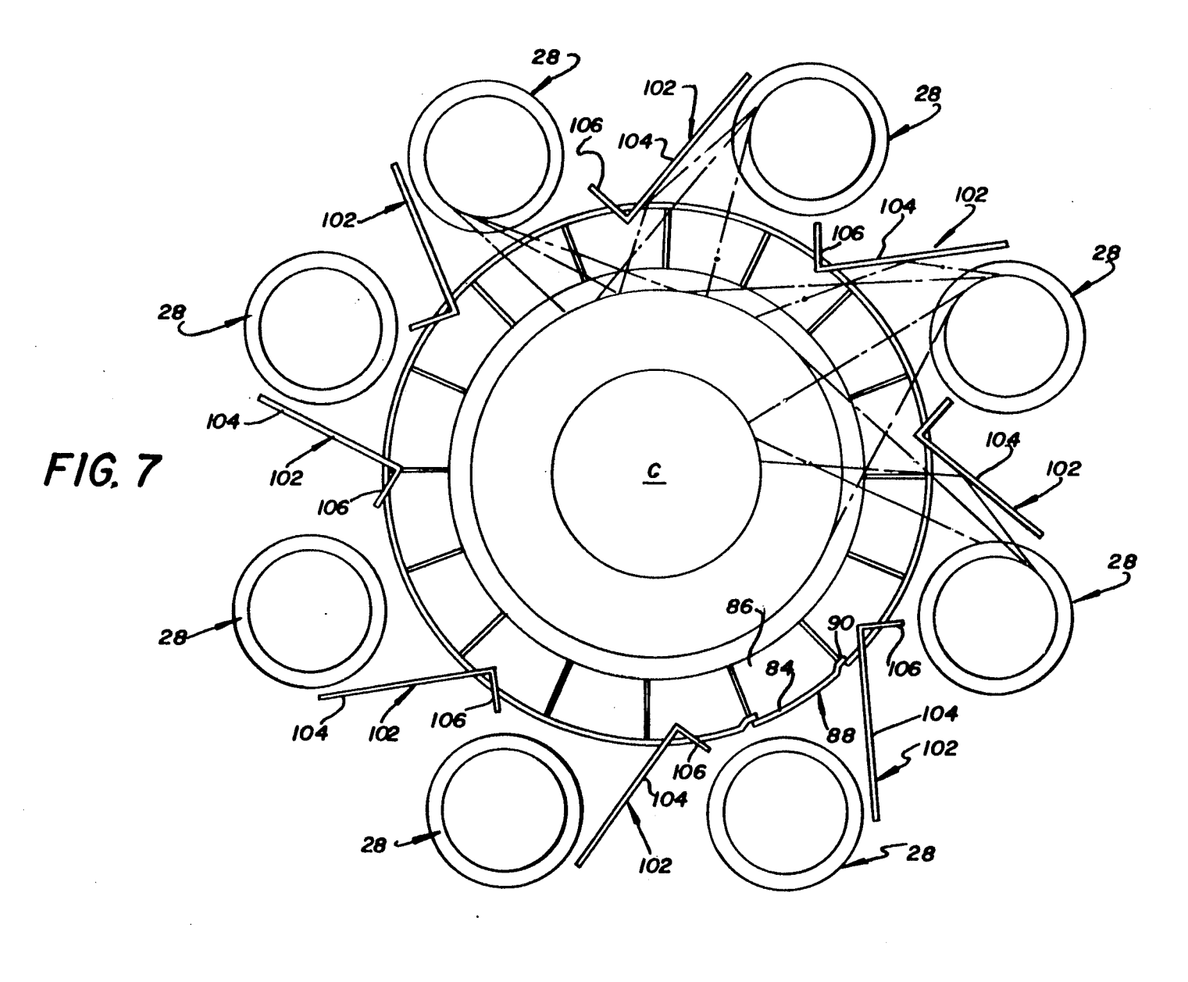
FIG. 7 is a schematic vertical transverse sectional view showing the general arrangement of the blast wheels, the pattern of abrasive particles from such blast wheels, and wear plates for controlling and limiting the flow of abrasive particles.

The housing portion 26 also includes an annular radially outwardly and axially sloping end wall 70 on which the blast wheel units 28 are fixedly mounted. One method is to have all of the blast wheel units at a selected angle to provide a blast pattern 72 of on the order of 5 degrees to 15 degrees to the vertical with a preferred angle of 10 degrees. This prevents the abrasive blast from one blast wheel unit from blasting on a next adjacent blast wheel unit. The preferred blast wheel unit mounting is, however, to, have every other blast wheel unit at a different angle. For example, four of the eight blast wheel units would be mounted on the order of 15 degrees to the vertical and the other four blast wheel units would be mounted on the order of 10 degrees to the vertical. With this arrangement the abrasive blast from one blast wheel unit does not blast onto an adjacent blast wheel unit and blast intereference as shown at C in FIG. 7 is eliminated thus promoting better cleaning.

It will be readily apparent from FIG. 5 that the eight blast wheel units 28 provide for a frustoconical blast curtain 76 through which a pipe P being cleaned must pass as the cleaning machine 20 traverses the pipe.

It is to be understood that the bouncing abrasive particles from the blast wheels 74 are confined within the housing 22 by the curtains 50, 54, 62, 68 with the abrasive particles remaining within the housing portions 24, 26 being directed to a collection trough 78 formed by the walls 46, 56 at the bottom of the housing portion 24. In order that the abrasive particles may be directed into the collection trough 78, the housing portion 26 has a downwardly sloping bottom wall portion 80. Additionally, the housing portion 32 between the curtains 62, 68 has a downwardly sloping bottom wall portion 80 which directs abrasive particles trapped between the curtains 62, 68 down into the trough 78. A similar bottom wall 82 of the housing portion 34 directs abrasive particles trapped between the curtains 50, 54 down into the collection trough 78.

In order to absorb the impact of any overspray from the blast pattern 72 missing the pipe P, cleaned, there is mounted within the housing 22 a wear ring 84 which is generally L-shaped in cross section, and includes a mounting flange 86. The function of the wear ring 84 is clearly illustrated in FIG. 5.

Referring now to the schematic showing of FIG. 7, it will be seen that the wear ring 84 is formed of a plurality of individual members generally identified by the numeral 88. Each of the members 88 is of a cast construction of a hardened metal and the ring member thereof has at one end an offset flange portion 90 so that when the members 88 are mounted in place, the offset flange portion 90 of one following member 88 overlaps the ring portion 84 of a previous member. The flange portion 86 of each of the members 88 is in slightly circumferentially spaced relation to facilitate the assembly without the flange portions 86 overlapping one another.

Figure 8:
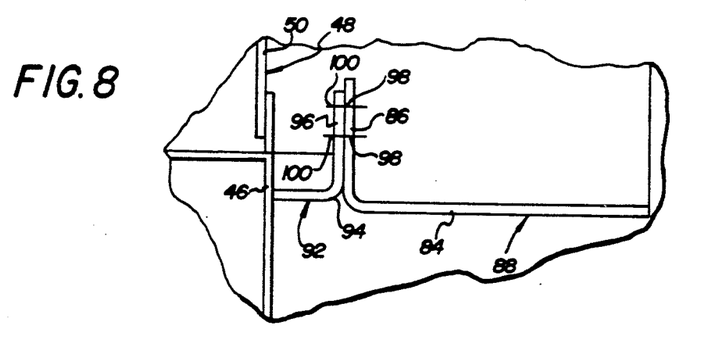
FIG. 8 is a fragmentary longitudinal sectional view through a portion of a wear ring for intercepting the blast of abrasive particles missing the pipe being cleaned and shows the specific details of the mounting of such wear ring.

Referring now to FIG. 8, it will be seen that the wear ring 84 is carried by the wall 46 by way of a support ring 92 which has a cylindrical flange 94 suitably secured to the wall 46 and includes an annular mounting flange 96. The annular flange 86 of each of the members 88 are provided with bores 98 aligned with bores 100 in the flange 96 through which suitable fasteners (not shown) pass to individually mount the members 88 for replacement.

Referring now to the schematic showing of FIG. 7, it will be seen that between each of the blast wheel units 28 there is a wear plate 102. Each wear plate extends transversely of a pipe P being cleaned and is positioned to control the deflection of abrasive particles away from adjacent blast wheels and onto the pipe for extra cleaning. It is to be noted that each wear plate 102 includes a relatively wide flange 104 and a narrower flange 106.

From the foregoing, it will be seen that there is apparatus for effecting the cleaning of pipes varying in diameter from 20 inches to 36 inches. Further, it will be seen that all abrasive particles from the blast wheel units 28 as well as foreign matter removed from the pipes will be directed into the collection trough 78. A recycling system 110 is provided for returning the collected materials to the top of the housing portion 24, for directing the collected material into a bin 112 which extends transversely of the machine 20. This is accomplished by way of an endless belt 114 which carries at intervals buckets 116 that extend transversely of the belt 114 and longitudinally of the machine.

Figure 6:
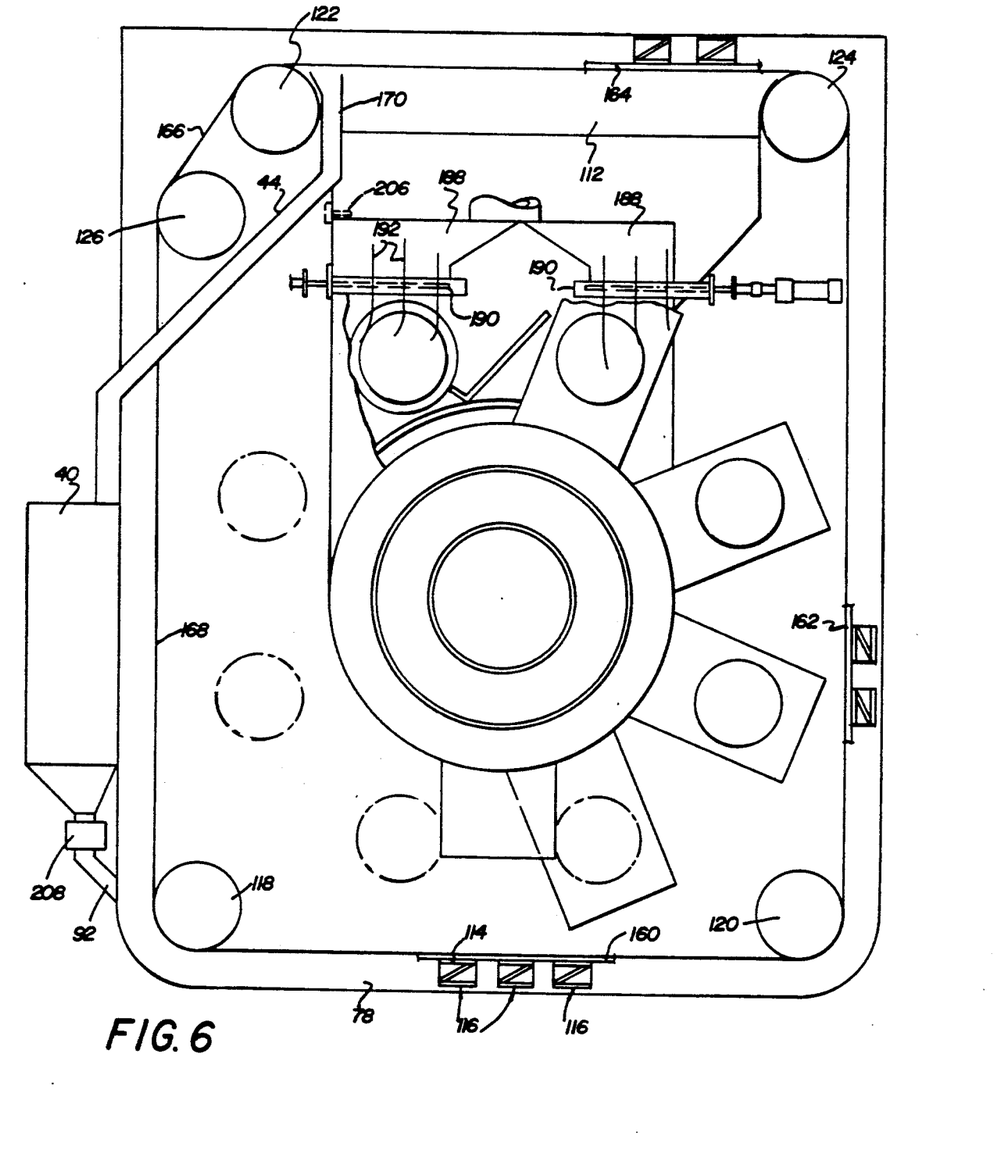
FIG. 6 is a transverse vertical sectional view showing the internal arrangement of the blast machine of FIG. 1 including the relationship of the machine with respect to minimum and maximum diameter pipes which can be cleaned utilizing the machine.

It will be seen from FIG. 6 that the belt 114 is entrained over a plurality of rollers including lower rollers 118, 120, upper rollers 122, 124 and a further roller 126. As is generally shown at the bottom of FIG. 5, the roller 118 is supported by a shaft 128 carried by a bearing assembly 130 which is mounted on the wall 46. It is to be understood that the shaft for one of the rollers is driven so as to drive the belt 114.

Figure 9:
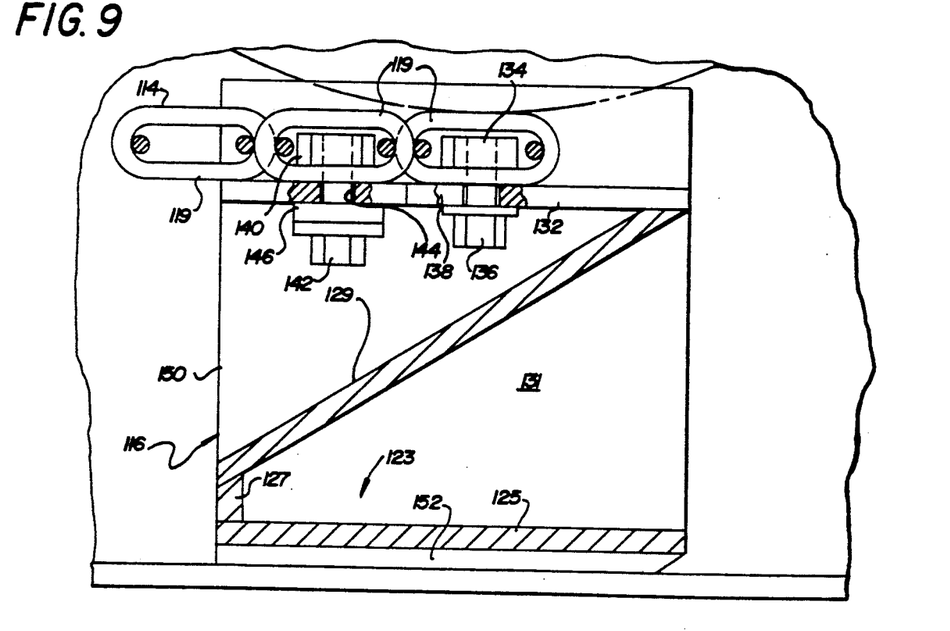
FIG. 9 is a fragmentary transverse sectional view through a lower run of the abrasive collection belt and shows the specific details of the mounting of a bucket thereon.
Figure 10:
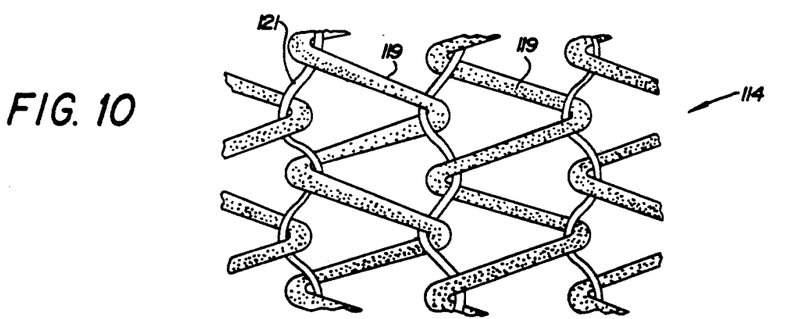
FIG. 10 is a fragmentary plan view showing the details of the abrasive belt.

Referring now to FIGS. 9 and 10, it will be seen that the belt 114 is of an open mesh wire construction which includes loop members 119 extending transversely of the belt with adjacent loop members being in alignment so that their end loops are disposed between two end loops of a next adjacent member 119. A transverse wire 121 extends through the end loops of adjacent end loop members 119 in generally sinusoidal relation so as to connect together the end loop members 119. The net result is that in side elevational view, the end loop members 119 have the general appearance of chain links. The belt 114 is thus of an open weave through which abrasive particles and collected foreign matter may freely pass.

In FIG. 9 there is illustrated the specific details of a typical bucket 116. A pocket of the bucket 116 is formed by a bent metal member 123 including a flange 125 disposed remote from and generally parallel to the general plane of an adjacent portion of the belt 114. At a rear edge of the flange 125, the bucket has a vertical rear flange portion 127 which at its upper edge terminates in a sloping flange 129 with the flange 129 sloping away from the flange 125 beginning at the flange 127. This defines a pocket 131 for receiving abrasive particles and foreign matter as the buckets 116 move forwardly within the collection trough 78.

The bucket forming member 123 is suitably secured, such as by welding, at its front and upper edge to the underside of a mounting plate 132. The mounting plate 132 is secured to the exterior surface of the belt 114.

It will be seen that a first bar 134 extends transversely of the belt 114 through one of the loop forming members 119 and the mounting plate 132 is secured to that bar 134 by at least two bolts 136 which pass through slots 138 and are threaded into the bar 134. Thus the mounting plate 132 is rigidly and fixedly secured to the bar 134.

In the loop forming member 119 immediately rearwardly of the bar 134 there is a second bar 140. The mounting plate 132 is secured to the second bar 140 by way of a bolt 142 having a resilient connection with the bar 140. The bolt 142 passes through an elongated opening 144 in the support member 132 and is threaded into the bar 140. There is a rubber washer 146 positioned between the head of the bolt 142 and the support plate 132 so as to provide a resilient connection between the support plate 132 and the bar 140. Thus the belt 114, with the buckets 116 attached, is free to bend and pass around the support rollers for the belt 114.

With particular reference to FIG. 5, it will be seen that each bucket 116 is provided at the opposite ends thereof with end plates 150 which extend, as shown in FIGS. 5 and 9, above the belt 114 and below the flange 125. The projecting lower edge of each side plate is identified by the numeral 152 and rides on a hardened rail 154.

At this time it is also pointed out that the bottom of the collection through 78 has an open area 156 which is normally covered by a hingedly mounted clean out plate 158.

The belt 114, which is endless, is shaped by the various rollers which support the same. As a result, the belt 114 has between the rollers 118, 120, a lower horizontal run 160. After the belt 114 passes around the roller 120, it assumes a vertical run 162 at which time the collected material including spent abrasive, is retained within the buckets 116. At the top of the vertical run 162, the belt 114 passes around the roller 124 and begins an upper horizontal run which extends between the rollers 122, 124, the upper horizontal run being identified by the numeral 164. At this time, the buckets 116 have rotated 180 degrees from their pickup position of FIG. 6 wherein because of the generally V-shape of the bucket, the bucket compartment 131 has assumed a dump position. The collected material is dumped on top of the belt 114 and readily flows through the open mesh of the belt 114 into the transversely elongated bin 112 as shown at the top of FIG. 5.

Returning once again to FIG. 6, it will be seen that the rollers 122, 126 define a downwardly and outwardly sloping run 166 of the belt with the roller 122 being adjustable and forming a take-up roller, while the rollers 126, 118 define a downwardly vertically sloping run 168 of the belt 114.

It should be apparent from FIGS. 5 and 6 that when the bin 112 begins to fill at one end thereof adjacent the roller 124, the belt 114 will act as a scraper and cause the materials deposited within the bin 112 to gradually move to the left.

The bin 112 terminates at the left hand thereof as viewed in FIG. 6 in an end wall 170 which is spaced below the run 164 of the belt 114 so that overflowing collected materials may be dragged by the belt 114 over the end wall 170 and down into the chute 44 for flow into an abrasive replenisher 40 for flow, as required through the return line 42 into the collection trough 78.

As previously pointed out, the side plates 150 also extend above the bucket 116. When the belt 114 assumes its inverted position at the top of the machine, as shown at the top of FIG. 5, the upper portions of the side plates 150 are disposed lowermost and ride upon hardened rails 172. These upper portions of the side plates 150 overlap the supporting rollers 118 etc. and maintain the belt on the rollers.

It will be seen that the bin 112 has a downwardly sloping bottom wall 174 which terminates in a horizontal lip 176. The bin 112 also includes a vertical wall 178 which terminates in spaced relation above the lip 176 to define a discharge passage 180. Flow through the discharge passage 180 is controlled by a pivotally mounted gate 182. The position of the gate 182 controls the return flow out of the bin 112 with the return flow being a curtain flow. By way of suitable air lines 184, 186, of which one is preferably in the form of a vacuum, air is circulated through the upper part of the machine and most certainly through the curtain flow out of the bin 112 so as to remove foreign matter from the abrasive particles. The net result is that clean returning abrasive particles are delivered into two bins 188 which are disposed in side-by-side relation as is shown in FIG. 6.

Each trough or hopper 188 is provided at the bottom thereof with an abrasive gate 190 for providing controlled discharge of the clean abrasive through hoses or pipes 192 which direct the abrasive particles on a continuous basis to an inlet 194 of an associated blast wheel 74.

Each hopper 188 has a partial top wall 196 which forms a wall of an overflow trough 198 having an opening 199 through which excess abrasive particles within each of the hoppers 188 may flow down into the interior of the machine for return to the collection trough 78.

In a like manner, any fine abrasive particles which may pass into the area above the trough 198 will flow down to the exterior of the machine to be discarded.

Referring once again to FIG. 2, it will be seen that the housing portion 24 is provided with a plurality of access doors through which access to the interior of the housing 22 may be readily obtained. These doors include vertical doors 200 extending up each side of the wall 46 and lower horizontal doors 202 at the bottom of the wall or panel 46.

In operation, power will be supplied to the individual motors 30 from an outside power source. The same outside power source will supply power for the motor for driving the belt 114. In addition, there will be a separate vacuum system connected to the cleaning machine for removing the foreign matter from the spent abrasives.

From a practical standpoint, in use, the cleaning machine is self-operating. It is only necessary to move the cleaning machine 20 along the pipe being cleaned at a rate wherein the desired cleaning of a pipe is effected.

Referring to FIG. 6, it will be seen that there is mounted in at least one of the hoppers 188 a probe 206 which determines the level of abrasive particles within the hoppers 188 and which serves to control the opening of a gate 208 disposed between the external supply 40 and the return line 42 so as to add abrasive particles to the system in the event the probe 206 indicates that the supply is low.

Although only a preferred embodiment of the cleaning machine has been specifically illustrated and described herein, it is to be understood that minor variations may be made in the machine without departing from the spirit and scope of the invention as defined by the appended claims.

I claim:

1. An abrasive cleaner for pipes and other elongated members, said cleaner comprising a housing having a fixed upstanding operating position, said housing having two remote sides, a first of said sides having an entrance opening and a second of said sides having an exit opening aligned with said entrance opening and defining an axial work piece path whereby an elongated member may extend through said housing for cleaning, a plurality of blast wheels carried by said first side in generally encircling relation to said entrance opening for throwing a circular curtain of abrasive particles into said housing around and transversely of said path for complete cleaning of an elongated member, said housing having a lower collection trough for spent abrasive particles, and abrasive particle return means for collecting abrasive particles and returning said abrasive particles to said blast wheels, said blast wheels being tilted relative to said first side to direct abrasive particles into said housing with a minimum of abrasive particles being thrown by a blast wheel onto adjacent blast wheels.

2. A cleaner according to claim 1 wherein said blast wheels are all tilted at an angle to the vertical on the order of 5 to 15 degrees.

3. A cleaner according to claim 1 wherein said blast wheels are all tilted at an angle to the vertical on the order of 10 degrees.

4. A cleaner according to claim 1 wherein said housing has therein a wear ring in the path of stray abrasive particles from said blast wheels shielding said housing from direct contact by high speed moving abrasive particles.

5. A cleaner according to claim 4 wherein said wear ring is L-shaped in cross section and includes an annular flange and a cylindrical flange with said cylindrical flange defining a primary abrasive particle impacting surface 6. A cleaner according to claim 5 wherein said wear ring is formed of replaceable circumferential segments.

7. A cleaner according to claim 6 wherein each segment has at an end of a cylindrical flange portion thereof a radially offset projecting overlap.

8. A cleaner according to claim 6 wherein said housing second side has mounting means for individually mounting said wear ring segments.

9. A cleaner according to claim 1 wherein there are abrasive particle deflectors between adjacent ones of said blast wheels for deflecting stray abrasive particles from a next adjacent one of said blast wheels into said housing.

10. An abrasive cleaner for pipes and other elongated members, said cleaner comprising a housing having a fixed upstanding operating position, said housing having two remote sides, a first of said sides having an entrance opening and a second of said sides having an exit opening aligned with said entrance opening and defining an axial work piece path whereby an elongated member may extend through said housing for cleaning, a plurality of blast wheels carried by said first side in generally encircling relation to said entrance opening for throwing a circular curtain of abrasive particles into said housing around and transversely of said path for complete cleaning of an elongated member, said housing having a lower collection trough for spent abrasive particles, and abrasive particle return means for collecting abrasive particles and returning said abrasive particles to said blast wheels, said return means including a belt generally lying in a plane disposed normal to said path cleaned between said entrance opening and said exit with said belt encircling said path, said belt being of a width generally corresponding to that of said collection trough and said belt being of an open construction whereby abrasive particles from said blast wheels may freely pass through a lower run of said belt into said collection trough.

11. A cleaner according to claim 10 wherein said belt is of an open wire mesh construction.

12. A cleaner according to claim 11 wherein said belt includes interior and exterior surfaces, and buckets extending transversely of said belt are secured to said belt exterior for removing abrasive particles from said collection trough.

13. A cleaner according to claim 12 wherein said buckets are secured to said belt by way of bars extending transversely of said belt through said belt, and said buckets are secured to said bars.

14. A cleaner according to claim 13 wherein each bucket is secured to said belt by way of two adjacent ones of said bars with each bucket being fixedly secured to one of said two bars, and resiliently connected to the other of said two bars whereby said belt is free to flex around supporting rollers.

15. A cleaner according to claim 12 wherein said buckets have supports at opposite ends of said buckets, and there are rails in said collection trough for supporting said buckets.

16. A cleaner according to claim 10 wherein means support said belt for movement through a path also including an upper run overlying an abrasive assume a dump position as said buckets move along said belt upper run to dump collected abrasive particles onto said belt upper run for passage through said belt into said return bin.

17. A cleaner according to claim 16 wherein said bin extends longitudinally of said belt upper run, and said belt serves as means for spreading collected abrasive particles along said bin.

18. A cleaner according to claim 16 wherein said bin has a discharge opening controlled by a discharge gate to produce a curtain flow, and there are air flow means for removing foreign matter from falling abrasive particles.

19. A cleaner according to claim 18 wherein there are two hoppers for gravity reception of falling cleaned abrasive particles, and means for delivering cleaned abrasive particles to blast wheels at each side of said cleaner.

20. A cleaner according to claim 19 wherein there is an external abrasive particle supply having a discharge leading into said housing, a gate controlling said discharge, and a probe associated with at least one of said hoppers controlling the opening of said gate.

21. A cleaner according to claim 20 wherein there are means for returning excess abrasive particles to said external abrasive particle supply.

22. A wear ring segment, said segment being formed of a hard material resistant to wear by abrasive particles thrown by blast wheels, said segment being of an L-shaped cross section and including integrally joined together part cylindrical flange portion and part annular flange portion, said part cylindrical flange portion terminating at one end in a radially inwardly offset projecting overlap.

23. An abrasive cleaner for pipes and other elongated members, said cleaner comprising a housing having a fixed upstanding operating position, said housing having two remote sides, a first of said sides having an entrance opening and a second of said sides having an exit opening aligned with said entrance opening and defining an axial work piece path whereby an elongated member may extend through said housing for cleaning, a plurality of blast wheels carried by said first side in generally encircling relation to said entrance opening for throwing a circular curtain of abrasive particles into said housing around and transversely of said path for complete cleaning of an elongated member, said housing having a lower collection trough for spent abrasive particles, and abrasive particle return means for collecting abrasive particles and returning said abrasive particles to said blast wheels, said blast wheels being tilted relative to said first side to direct abrasive particles into said housing with a minimum of interference between abrasive particles thrown by adjacent blast wheels.

24. A cleaner according to claim 23 wherein said blast wheels are mounted in alternating relation in sets, one of said sets being tilted at a first angle, and the other of said sets being tilted at a second and different angle.

25. A cleaner according to claim 24 wherein said first angle is on the order of 15 degrees and said second angle is on the order of 10 degrees.

* * * * *